United States Patent
Seo

(10) Patent No.: US 9,171,395 B2
(45) Date of Patent: Oct. 27, 2015

(54) SYSTEM AND METHOD FOR DISPLAYING GUIDANCE SYMBOL

(75) Inventor: Jung Kak Seo, Seoul (KR)

(73) Assignee: Thinkware Systems Corporation, Seoul (KR)

( * ) Notice: Subject to any disclaimer, the term of this patent is extended or adjusted under 35 U.S.C. 154(b) by 854 days.

(21) Appl. No.: 12/992,195

(22) PCT Filed: Jun. 29, 2008

(86) PCT No.: PCT/KR2008/003795
§ 371 (c)(1),
(2), (4) Date: Nov. 11, 2010

(87) PCT Pub. No.: WO2009/139519
PCT Pub. Date: Nov. 19, 2009

(65) Prior Publication Data
US 2011/0102468 A1    May 5, 2011

(30) Foreign Application Priority Data
May 15, 2008    (KR) .................. 10-2008-0044911

(51) Int. Cl.
G09G 5/00    (2006.01)
G06T 15/20    (2011.01)
G09G 5/22    (2006.01)
G06T 19/20    (2011.01)

(52) U.S. Cl.
CPC ............... *G06T 15/20* (2013.01); *G06T 19/20* (2013.01); *G09G 5/22* (2013.01); *G06T 2219/2016* (2013.01)

(58) Field of Classification Search
CPC ......... G06Q 10/10; G09G 5/00; G09G 5/373; G09G 5/14; G09G 5/34; G09G 5/02; G01C 23/00; G01C 23/005; G01C 21/00; G01C 21/26; G01C 5/005; G06F 3/0482; G06F 3/017; G06F 17/3053
USPC ........................................................ 345/660
See application file for complete search history.

(56) References Cited

U.S. PATENT DOCUMENTS

| | | | | |
|---|---|---|---|---|
| 7,460,952 B2 * | 12/2008 | Ogaki et al. | .................. | 701/428 |
| 2008/0077882 A1 * | 3/2008 | Kramer et al. | ................ | 715/810 |
| 2009/0157287 A1 * | 6/2009 | Shafaat et al. | ................ | 701/120 |

FOREIGN PATENT DOCUMENTS

| | | | |
|---|---|---|---|
| JP | 10-091649 A | 4/1998 |
| JP | 2005-321370 A | 11/2005 |
| KR | 10-1998-0023101 A | 7/1998 |
| KR | 10-2005-0037883 A | 4/2005 |
| KR | 10-2006-0045469 A | 5/2006 |

* cited by examiner

*Primary Examiner* — Mark Zimmerman
*Assistant Examiner* — F. M. Hossain
(74) *Attorney, Agent, or Firm* — Fox Rothschild LLP

(57) ABSTRACT

Disclosed are a system and a method of displaying a guidance symbol. The guidance symbol displaying system may include a distance difference calculator to calculate a distance difference between a user location and a guidance symbol location, and a symbol display controller to control display of the guidance symbol by calculating a size of the guidance symbol based on the distance difference.

8 Claims, 4 Drawing Sheets

SYSTEM AND METHOD FOR DISPLAYING GUIDANCE SYMBOL

CROSS-REFERENCE TO RELATED APPLICATIONS

This application is the U.S. national stage application of International Patent Application No. PCT/KR2008/003795, filed Jun. 29, 2008, which claims priority to Korean Application No. 10-2008-0044911, filed May 15, 2008, the disclosures of each of which are incorporated herein by reference in their entirety.

TECHNICAL FIELD

The present invention relates to a system and a method for displaying a three-dimensional (3D) guidance symbol, and particularly, to a system and a method for displaying, in a screen, a guidance symbol having a size recognizable from a long distance, and at the same time, for giving perspective to the guidance symbol according to the distance.

BACKGROUND ART

When guidance information is expressed using a symbol image, a method for displaying a symbol may include a method of displaying the symbol image in screen coordinates by reflecting a location to a two-dimensional (2D) screen, a method of reflecting the location of the symbol in a real three-dimensional (3D) map, and the like. In a first method, since the symbol is displayed in the same size on the screen regardless of a distance, the symbol may be hard to be expressed as a structure in a map and may be expressed as a simple symbol image. In a second method, since the guidance information is inserted to the map, the symbol may be expressed in 3D that looks like a real structure and may provide more realistic guidance. However, since the symbol looks like the real structure, it may be displayed in a significantly small size when it is located a long distance away where the symbol is not seen.

Accordingly, a symbol displaying method that changes a size of a symbol according to a distance, and at the same time, displays the symbol in a regular size to provide visibility when the symbol is a long distance away, is required.

DISCLOSURE OF INVENTION

Technical Goals

An aspect of the present invention provides a guidance symbol displaying method and system that is more realistic and improves user satisfaction by embodying a guidance symbol that varies according to a distance to the user.

Another aspect of the present invention also provides a guidance symbol displaying method and system that improves user convenience by increasing a visibility of a symbol, through embodying a guidance symbol that varies according to a distance to the user, and at the same time, through displaying the guidance symbol in a size recognizable even from a long distance.

Technical Solutions

According to an aspect of the present invention, there is provided a system of displaying a guidance symbol, including a distance difference calculator to calculate a distance difference between a user location and a guidance symbol location, and a symbol display controller to control display of the guidance symbol by calculating a size of the guidance symbol based on the distance difference.

The symbol display controller may includes a symbol size calculator to calculate a size of the guidance symbol displayed in a screen and a symbol location storing unit to store a updated location of the guidance symbol.

The symbol size calculator may includes a correction distance storing unit to store a correction distance that determines whether the size of the guidance symbol is to be corrected, a scale value calculator to calculate a scale value for correcting the size of the guidance symbol, and a scale value corrector to correct the calculated scale value.

According to another aspect of the present invention, there is provided a method of displaying a guidance symbol, including calculating a distance difference between a user location and a guidance symbol location, displaying the guidance symbol by calculating a size of the guidance symbol based on the distance difference.

The displaying of the guidance symbol includes calculating a size of the guidance symbol displayed in a screen, and storing an updated location of the guidance symbol.

The calculating of the size of the guidance symbol calculates the size of the displayed symbol by multiplying the corrected scale value by the size of the guidance symbol that corresponds to the distance difference.

Advantageous Effect

According to an example embodiment of the present invention, there may be provided a guidance symbol displaying method and system that is more realistic and improves user satisfaction by embodying a guidance symbol that varies according to a distance to the user.

According to an example embodiment of the present invention, there may be provided guidance symbol displaying method and system that improves user convenience by increasing a visibility of a symbol, through embodying a guidance symbol that varies according to a distance to the user, and at the same time, through displaying the guidance symbol in a size recognizable even from a long distance.

BEST MODE FOR CARRYING OUT THE INVENTION

Figure 1:
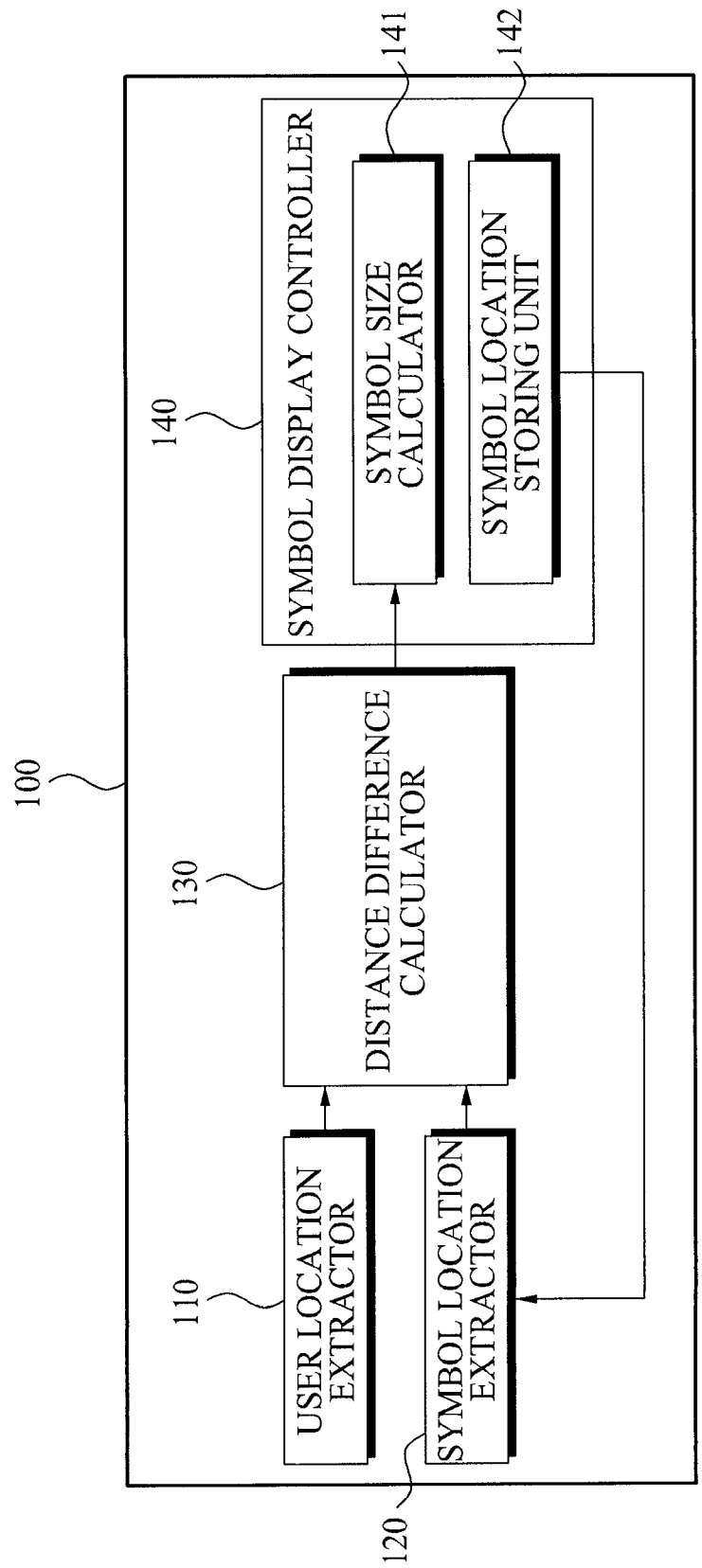
FIG. 1 illustrates a configuration of a guidance symbol displaying system according to an example embodiment of the present invention.

Although a few exemplary embodiments of the present invention have been shown and described, the present invention is not limited to the described exemplary embodiments, wherein like reference numerals refer to the like elements throughout.

FIG. 1 illustrates a configuration of a guidance symbol displaying system according to an example embodiment of the present invention.

Referring to FIG. 1, the guidance symbol displaying system includes a user location extractor 110, a symbol location extractor 120, a distance difference calculator 130, and a symbol display controller 140.

The user location extractor 110 extracts a current user location. In this instance, the user location may be a car location. Accordingly, since a location coordinate value is changed according to movement of the car, a current location coordinate value may be extracted.

The symbol location extractor 120 extracts a symbol location of a symbol that is displayed for convenience of the user. In this instance, the symbol that is displayed for convenience of the user may be a symbol used for guiding the user, and the symbol used for guiding the user may be a destination-indicating-symbol, a direction-indicating symbol, a flag, and the like.

Since a symbol displayed in a screen may be one or more and the symbol location may be changed according to a change of an area, and the like, a location coordinate value of a current symbol is extracted. That is, as an example, since the direction-indicating symbol may be displayed at each point and the location of the direction-indicating symbol may be different at each point, the symbol location extractor 120 may extract a symbol location of a symbol that is to be currently displayed.

The distance difference calculator 130 calculates a distance difference between a current user location and a guidance symbol location. Since a size of the symbol is controlled according to a distance difference between the user location and the guidance symbol location, the distance difference calculator 130 may calculate the distance difference between the user location and the guidance symbol location.

The symbol display controller 140 controls display of the guidance symbol, and thus, the user may recognize the guidance symbol and the distance difference between the user location and the guidance symbol location. In this instance, the symbol display controller 140 may include a symbol size calculator 141 and a symbol location storing unit 142.

The symbol size calculator 141 calculates a size of the symbol according to a distance and calculates the size of the symbol to maintain a regular size when the symbol is located at a long distance. In this instance, a scale value used for calculating the size of the symbol displayed in the screen may be calculated by Equation 1 below.

$$\text{if } dist(P_{symbol}, P_{car}) >= D_{symbol} \text{ then } S = dist(P_{symbol}, P_{car})/D_{symbol}$$
$$\text{else } S = 1.0 \qquad \text{[Equation 1]}$$

Here, dist ($P_{symbol}$, $P_{car}$) is a distance between the guidance symbol and the user (car), $D_{symbol}$ is a distance to the car, and the symbol may be displayed in the same size within the distance. That is, the distance may be a minimum distance that determines the size of the guidance symbol is to be corrected. Accordingly, when the distance is greater than or equal to $D_{symbol}$, the size of the guidance symbol is corrected to be displayed in the same size.

According to Equation 1, the symbol may be displayed in the same size when the distance is greater than or equal to $D_{symbol}$, and the symbol may be displayed like a real structure, when the distance is less than $D_{symbol}$.

Here, a configuration of the symbol size calculator 141 will be described in detail with reference to FIG. 2.

The symbol location storing unit 142 stores a guidance symbol location again when the guidance symbol location is changed, and provides the changed guidance symbol location when a distance difference between the user location and the guidance symbol location is calculated.

As described above, the scale value calculator 220 calculates the size of the symbol which varies to give perspective according to a distance, enables recognition of the symbol even seen from a long distance. Accordingly, the scale value calculator 220 enables the user to easily recognize the guidance symbol, thereby providing an effect of improving user convenience.

Figure 2:
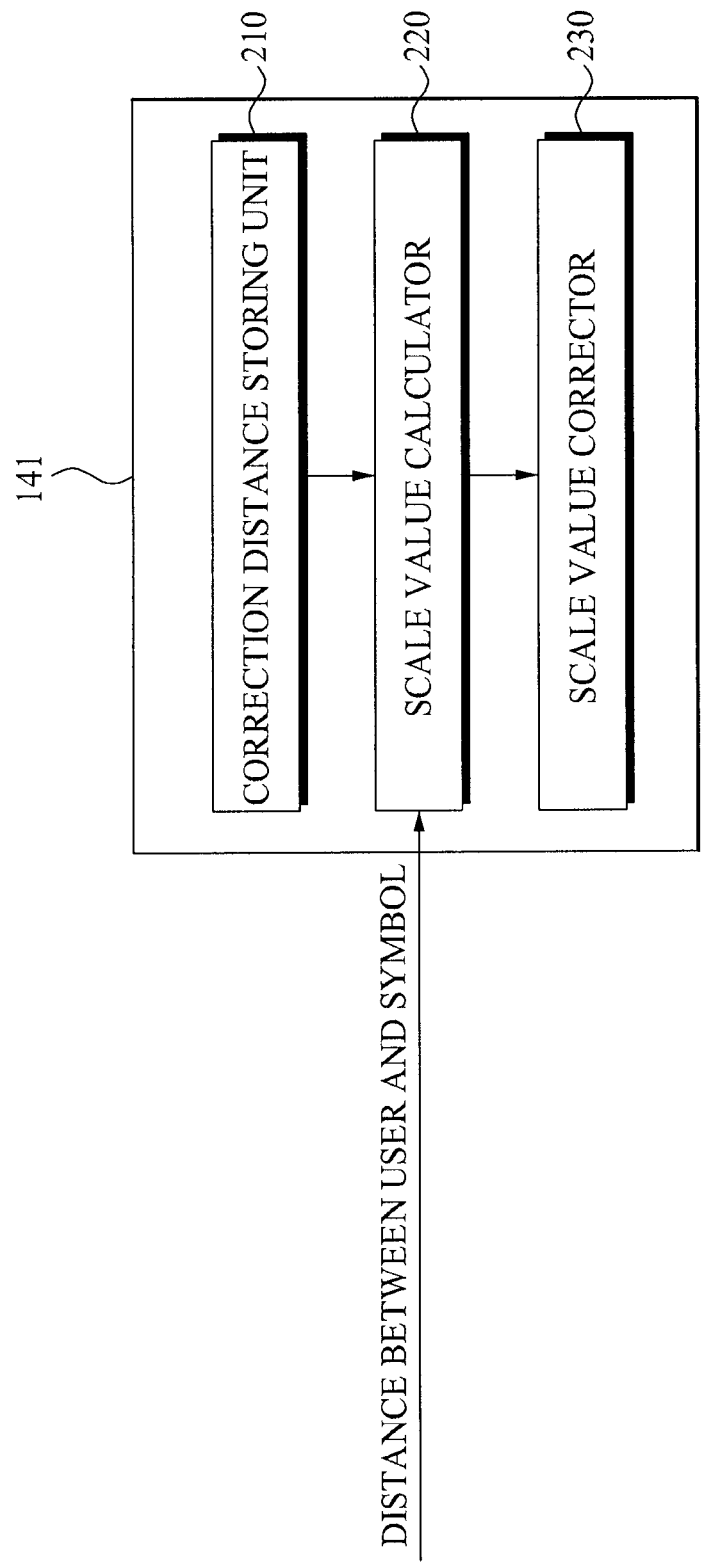
FIG. 2 illustrates a configuration of a symbol size calculator according to an example embodiment of the present invention.

FIG. 2 illustrates a configuration of a symbol size calculator according to an example embodiment of the present invention.

Referring to FIG. 2, the symbol size calculator 141 may include a correction distance storing unit 210, a scale value calculator 220, and a scale value corrector 230.

The correction distance storing unit 210 stores a distance that determines whether a size of a guidance symbol is to be corrected. In this instance, the correction distance is a distance to a user location, and when the guidance symbol at the correction distance is expressed in 3D without correction, the guidance symbol may be displayed excessively small, thereby being difficult to be recognized by the user. Also, the correction distance may vary depending on environment or through experiment, and the like.

The scale value calculating unit 220 calculates a scale value used for correcting the size of the guidance symbol. In this instance, the scale value is calculated by dividing a distance difference between the user location and the guidance symbol location by the correction distance. Here, the scale value further increases as the distance difference between the user location and the guidance symbol location increases. That is, a guidance symbol that is too small in size for the user to recognize is magnified through multiplying the guidance symbol by a scale value greater than or equal to one, and thus, the guidance symbol is displayed in a regular size when the distance difference is greater than or equal to the correction distance.

The scale value corrector 230 corrects the scale value according to the distance difference. In this instance, when the scale value is less than one, the scale value is changed into one, and when the scale value is greater than or equal to one, the calculated scale value is maintained. Here, a case of when the scale value is less than one corresponds to a case of when the distance difference between the user location and the guidance symbol location is less than the correction distance. In the case, a size of a 3D object varies to have perspective, however, depending on a distance, is displayed as is.

That is, when the size of the guidance symbol is corrected by applying the calculated scale value as is, the guidance symbol is displayed in the predetermined size even if the distance difference is less than the correction distance, and thus the guidance symbol does not have perspective.

Accordingly, when the distance difference is less than the correction distance, the 3D object, the size of which varies according to a distance to have perspective, is displayed as is, and at the same time, when the distance difference is greater than or equal to the correction distance, the guidance symbol is displayed in the regular size, and thus, the user may easily recognize the guidance symbol.

Therefore, the scale value calculator 220 calculates the size of the guidance symbol to display the guidance symbol having appropriate perspective in a short distance, whereas the scale value calculator 220 calculates the size of the guidance symbol to display the guidance symbol in the regular size.

Accordingly, when the guidance symbol is displayed, visibility and user satisfaction may be improved based on the described configuration.

Figure 3:
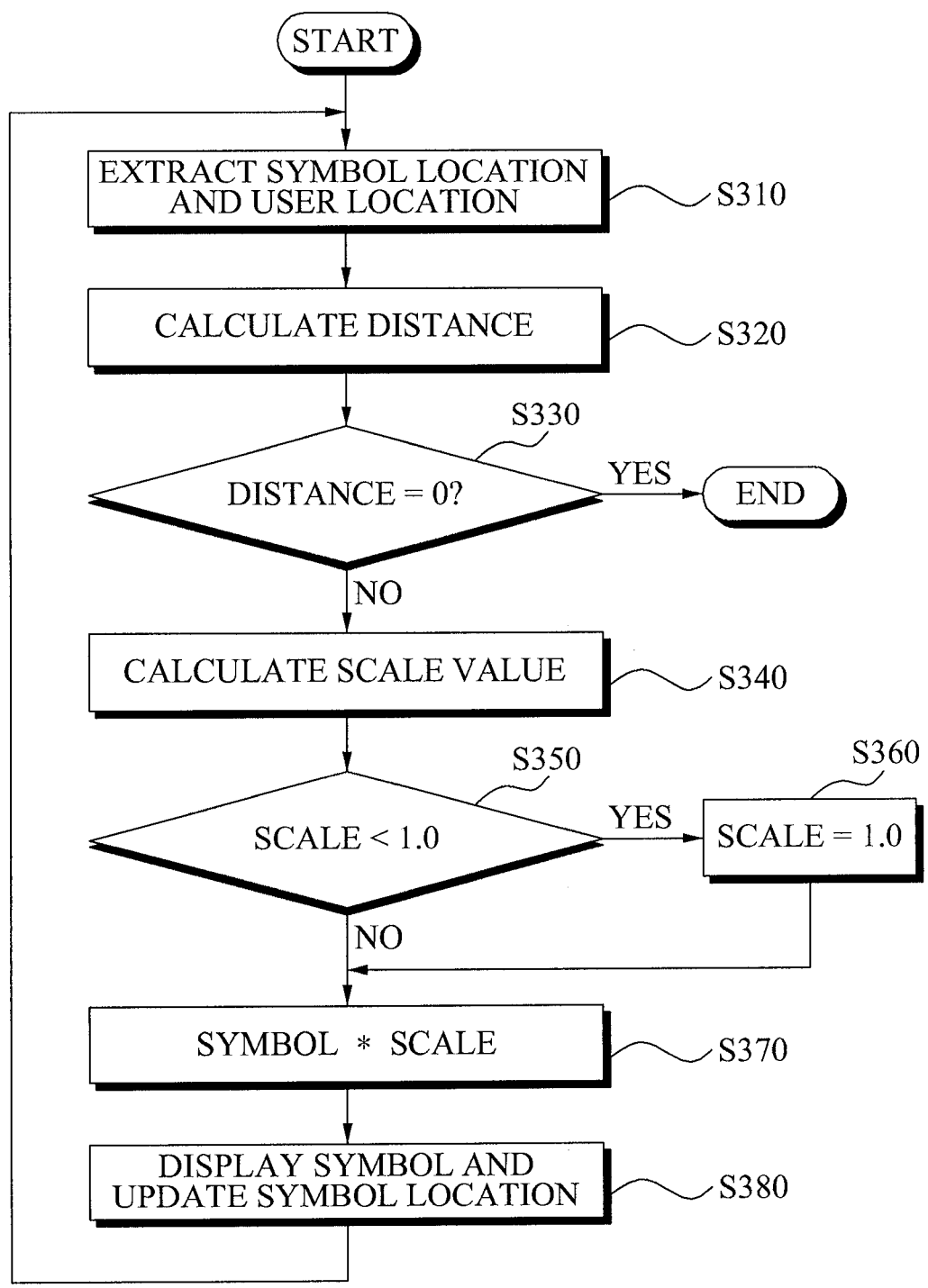
FIG. 3 is a flowchart illustrating a method of displaying a guidance symbol according to an example embodiment of the present invention.

FIG. 3 is a flowchart illustrating a method of displaying a guidance symbol according to an example embodiment of the present invention.

Referring to FIG. 3, a guidance symbol location where the guidance symbol is displayed and a user location are extracted in operation S310. In this instance, since the user location and the guidance symbol location are varying values, current location values may be extracted.

In operation S320, a distance between the user location and the guidance symbol is calculated based on the extracted guidance symbol location and the extracted user location. That is, a distance difference of the two locations may be calculated to control a size of the guidance symbol that is displayed according to the distance of the user location and the guidance symbol.

In operation S330, whether the two locations are the same is determined. That is, whether the distance difference between the user location and the guidance symbol location is within a predetermined value is determined, and when the distance difference is within the predetermined value, the two locations are determined to be the same location. For example, when whether the distance difference between the two locations is zero is determined, and the distance difference is determined to be zero and display of the guidance symbol is completed. As an example, when a car approaches to a point and a distance difference between the car and the direction-indicating symbol is zero, display of the direction-indicating symbol is completed. In this instance, the distance difference between the two locations may be greater than zero, and may be set as a value that enables two locations to be regarded as the same location, or being determined by an experiment, and the like.

In operation S340, a scale value to correct the size of the guidance symbol is calculated. In this instance, the scale value is calculated by dividing the distance difference between the user location and the guidance symbol location by a minimum distance that determines whether a size of a guidance symbol is to be corrected, namely, a correction distance. Accordingly, when the distance between the user location and the guidance symbol location is greater than the correction distance, the scale value that is greater than one is calculated, and when the distance between the user location and the guidance symbol location is less than the correction distance, the scale value that is less than one is calculated.

In operation S350, whether the scale value is less than one is determined. That is, when the scale value is less than one, the distance of the guidance symbol is closer than the correction distance, and thus, there is no need to correct the size of the guidance symbol to display in a regular size. Therefore, to discriminate the described cases, whether the scale value is less than one is determined.

In operation S360, when the scale value is determined as value less than one, the calculated scale value is changed into one. That is, when the distance of the guidance symbol is closer than the correction distance, the scale value is set to one to give perspective to the guidance symbol, the size of the guidance symbol varying depending on the distance, as opposed to correcting of the size of the guidance symbol to display in the regular size in a screen.

In operation S370, a size of the symbol to be displayed is calculated by multiplying the scale value by the size of the guidance symbol corresponding to the distance difference. That is, a case of when the guidance symbol location is farther than the correction distance corresponds to a case that the scale value is greater than one, and thus, the size of the guidance symbol is magnified by multiplying the size of the guidance symbol by the scale value, thereby displaying the guidance symbol in the regular size. Conversely, a case of when the guidance symbol location is closer than the correction distance corresponds to a case that the calculated scale value is less than one, the scale value is changed to one in operation S360. Accordingly, the guidance symbol, the size of the guidance symbol varying depending on the distance, is displayed by multiplying the scale value, namely one, by the size of the guidance symbol.

In operation S380, the guidance symbol is displayed in the screen and an updated guidance symbol location is stored. That is, the guidance symbol, the size of which is finally determined is displayed in the screen, and the guidance symbol location is stored although the guidance symbol location is changed and provided when the distance difference between the user location and the guidance symbol is calculated again, thereby the screen precisely displays the guidance symbol even though the guidance symbol location is changed.

As described above, when the guidance symbol location is far, the size of the guidance symbol is corrected to be displayed in the regular size. When the guidance symbol location is close, the guidance symbol the size of which varies to have perspective, is displayed, and thus, visibility of the guidance symbol increases. At the same time, the guidance symbol varies according to the distance in the same manner of other 3D objects on a map, and thus user satisfaction increases.

Figure 4:
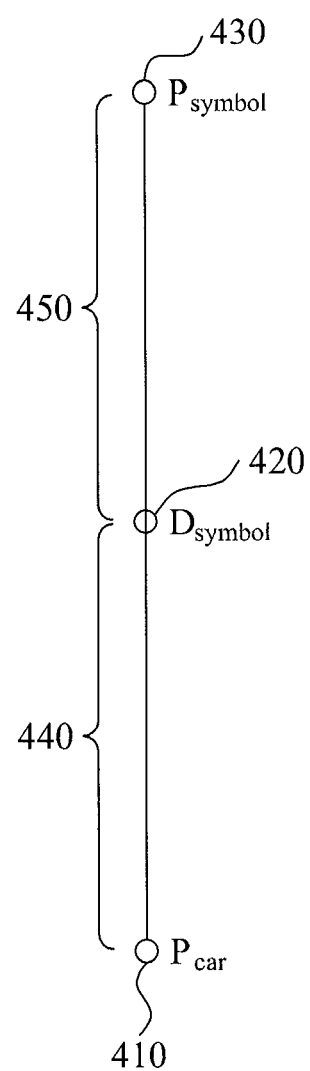
FIG. 4 illustrates a method of calculating a size of a symbol according to an example embodiment of the present invention.

FIG. 4 illustrates a method of calculating a size of a symbol according to an example embodiment of the present invention.

Referring to FIG. 4, a car location $P_{car}$ 410 and a guidance symbol location $P_{symbol}$ 430 are extracted and a distance difference between two locations is calculated. A scale value is calculated through dividing the distance difference by a correction distance $D_{symbol}$ 420 that is a minimum distance which determines whether a size of a guidance symbol is to be corrected. That is, since the distance difference between the car location $P_{car}$ 410 and the guidance symbol location $P_{symbol}$ 430 is greater than the correction distance $D_{symbol}$ 420, the scale value is greater than one, and thus, the guidance symbol is displayed in a regular size through multiplying the scale value by the size of the guidance symbol. In this instance, when the guidance symbol location $P_{symbol}$ 430 is in a section 450 that is farther than the correction distance, the guidance symbol is displayed in the regular size through multiplying a scale value greater than one by the size of the guidance symbol. Here, in the section 450 that is farther than the correction distance, the scale value further increases and, inversely, the size of the symbol that is expressed in the 3D decreases, when the guidance symbol location $P_{symbol}$ 430 is far away. Accordingly, the guidance symbol is displayed in the regular size by multiplying the size of the guidance symbol by the scale value.

Conversely, in this instance, when the guidance symbol location $P_{symbol}$ 430 is in a section 440 that is closer than the correction distance, the scale value that is less than one is calculated, and is changed into one by correction. Accordingly, the guidance symbol the size of which varies depending on a distance is displayed as is through multiplying the scale value, namely one, by the size of the guidance symbol, thereby displaying the guidance symbol having perspective.

The method of displaying the guidance symbol according to the exemplary embodiments of the present invention includes computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A system of displaying guidance symbols, comprising:
a display configured to display a plurality of guidance symbols on a 3D map, each of the guidance symbols having respectively corresponding positions on the 3D map to represent guidance symbol locations; and
a controller configured to:
display of each of the guidance symbols at respectively corresponding positions on the 3D map according to distance differences between a predetermined location and guidance symbol locations respectively corresponding to the guidance symbols;
scale a size of a display guidance symbol to a scaled-size based upon a scale value when a distance difference between a guidance symbol location for the guidance symbol and a predetermined location is less than a first distance;
set a size of a display guidance symbol to a fixed size when a distance difference between a guidance symbol location for the guidance symbol and a predetermined location is greater than the first distance;
wherein each of the guidance symbols respectively correspond to guidance symbol locations different from each other.

2. The system of claim 1, wherein the controller is further configured to:
calculate the distance difference between a predetermined location and the guidance symbol location, and
determine a scale value according to the calculated distance difference when the calculated distance difference is less than the first distance.

3. The system of claim 1, wherein the predetermined location is a user location or a vehicle location.

4. The system of claim 1, wherein the controller is further configured to disappear one of the guidance symbols on the display when the distance difference between the user location or the vehicle location and the guidance symbol location corresponding to the one of the guidance symbols is less than a second distance, which is less than the first distance.

5. A method of displaying guidance symbols, each of the guidance symbols having respectively corresponding positions on the 3D map to respectively represent guidance symbol locations on a display, comprising:
scaling a size of a guidance symbol to a scaled-size based upon a scale value when a distance difference between a guidance symbol location for the guidance symbol and a predetermined location is less than a first distance;
setting a size of a guidance symbol to a fixed-size when a distance difference between a guidance symbol location liar the guidance symbol and a predetermined location is greater than the first distance; and
displaying each of fixed-size set and scaled-size guidance symbols at respectively corresponding positions on the 3D map;
wherein each of the guidance symbols respectively correspond to guidance symbol locations different from each other.

6. The method of claim 5, wherein the controlling the display further includes:
calculating the distance difference between a predetermined location and the guidance symbol location, and
determining a scale value of each of the guidance symbols based on the calculated distance difference when the calculated distance difference is less than the first distance.

7. The method of claim 5, wherein the predetermined location is a user location or a vehicle location.

8. The method of claim 7, further comprising:
disappearing guidance symbols on the display when the distance difference between the user location or the vehicle location and the guidance symbol location corresponding to the one of the guidance symbols is less than a second distance, which is less than the first distance.

* * * * *